Feb. 3, 1948.     H. W. HAPMAN     2,435,498
CONVEYOR STRUCTURE WITH PIVOTED BUCKETS
Filed June 3, 1943     6 Sheets-Sheet 4
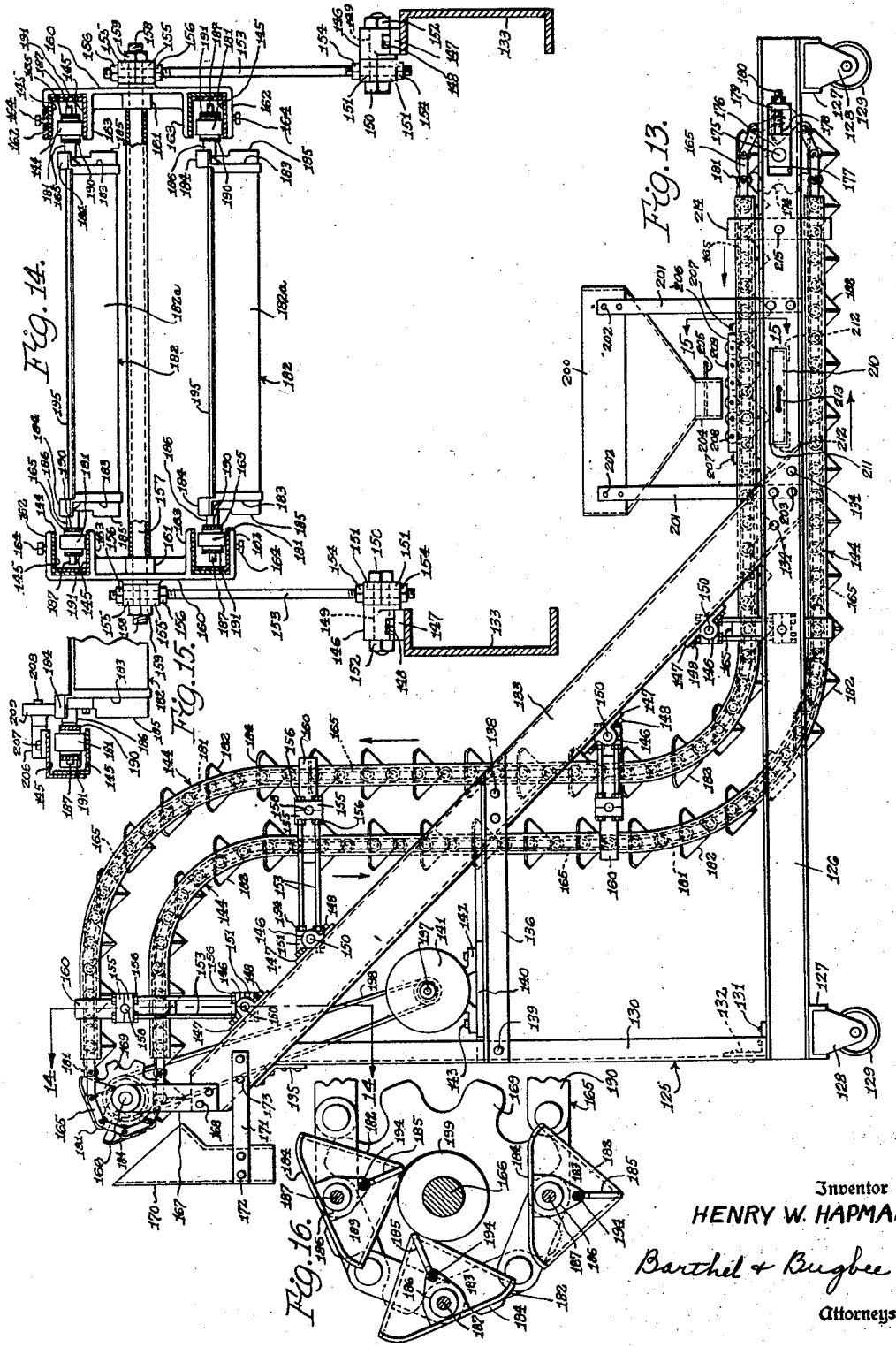
Inventor
HENRY W. HAPMAN
Barthel & Bugbee
Attorneys

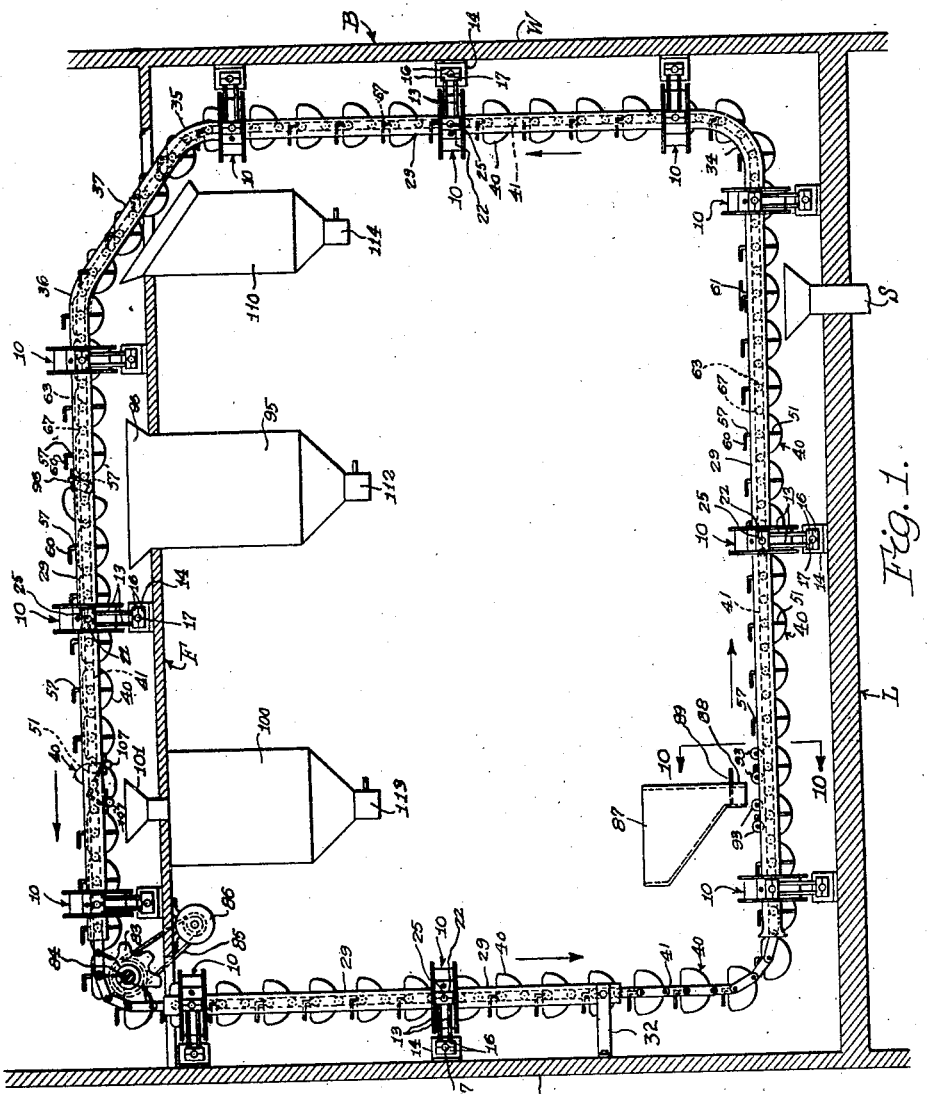

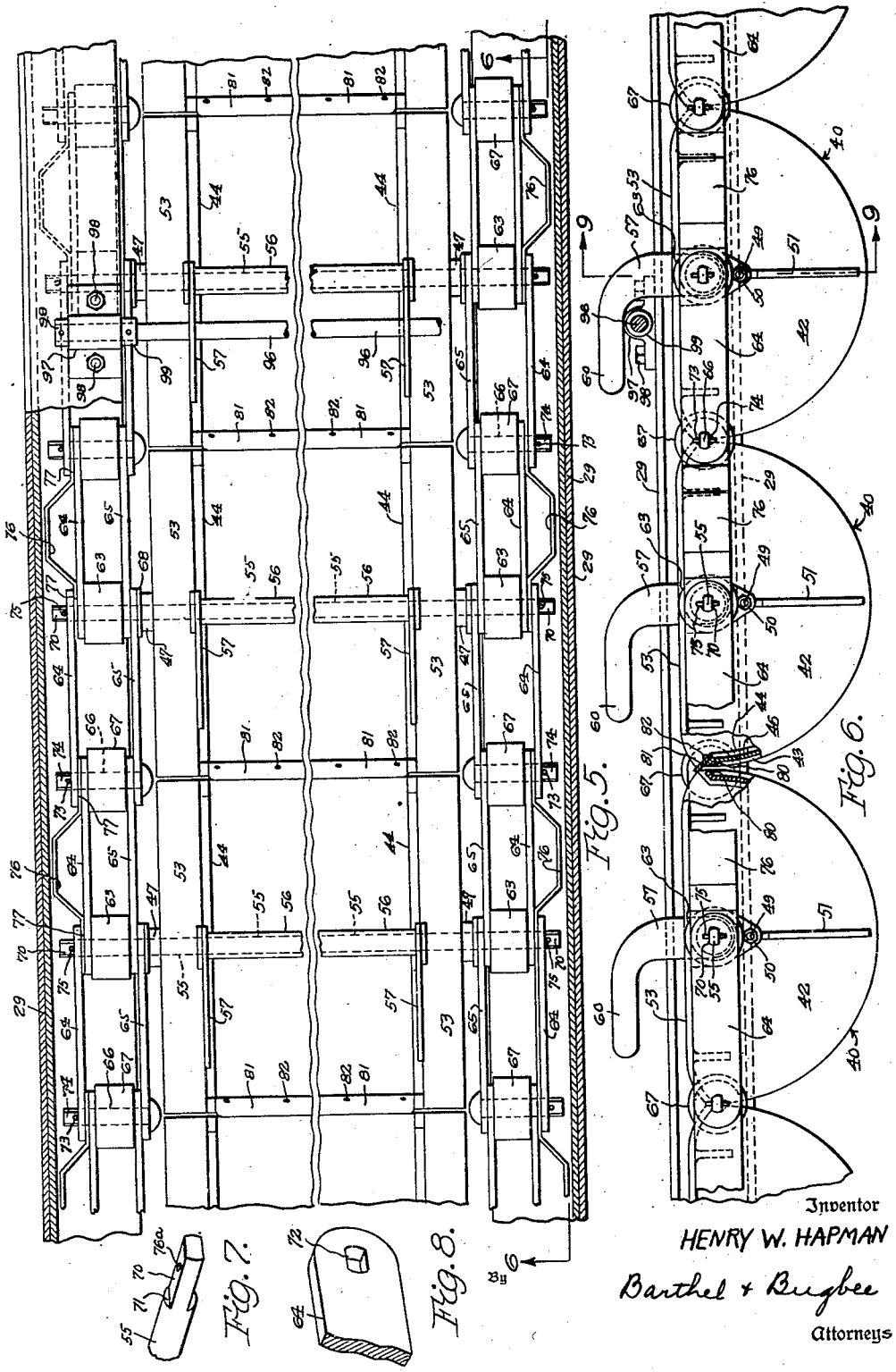

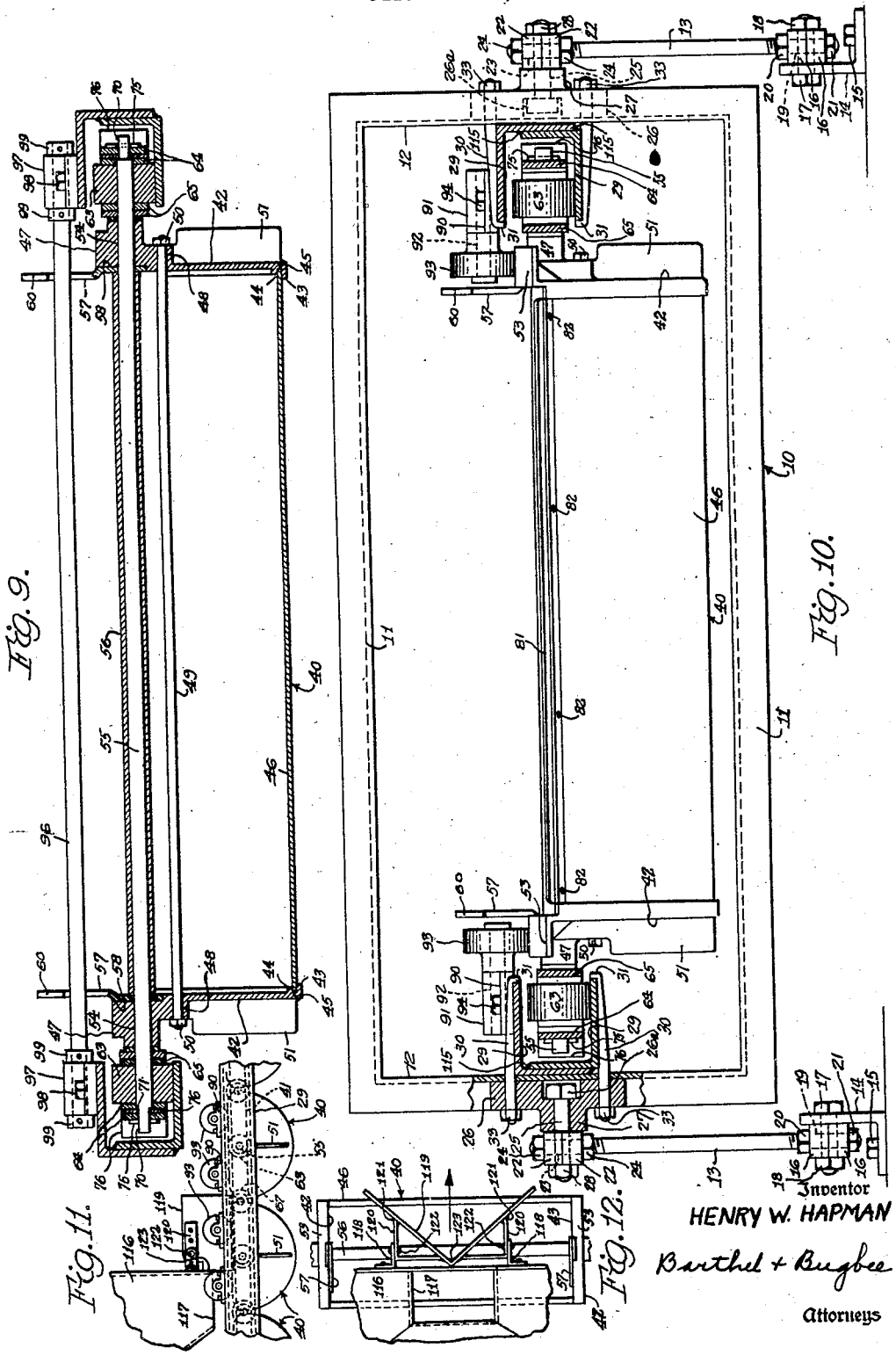

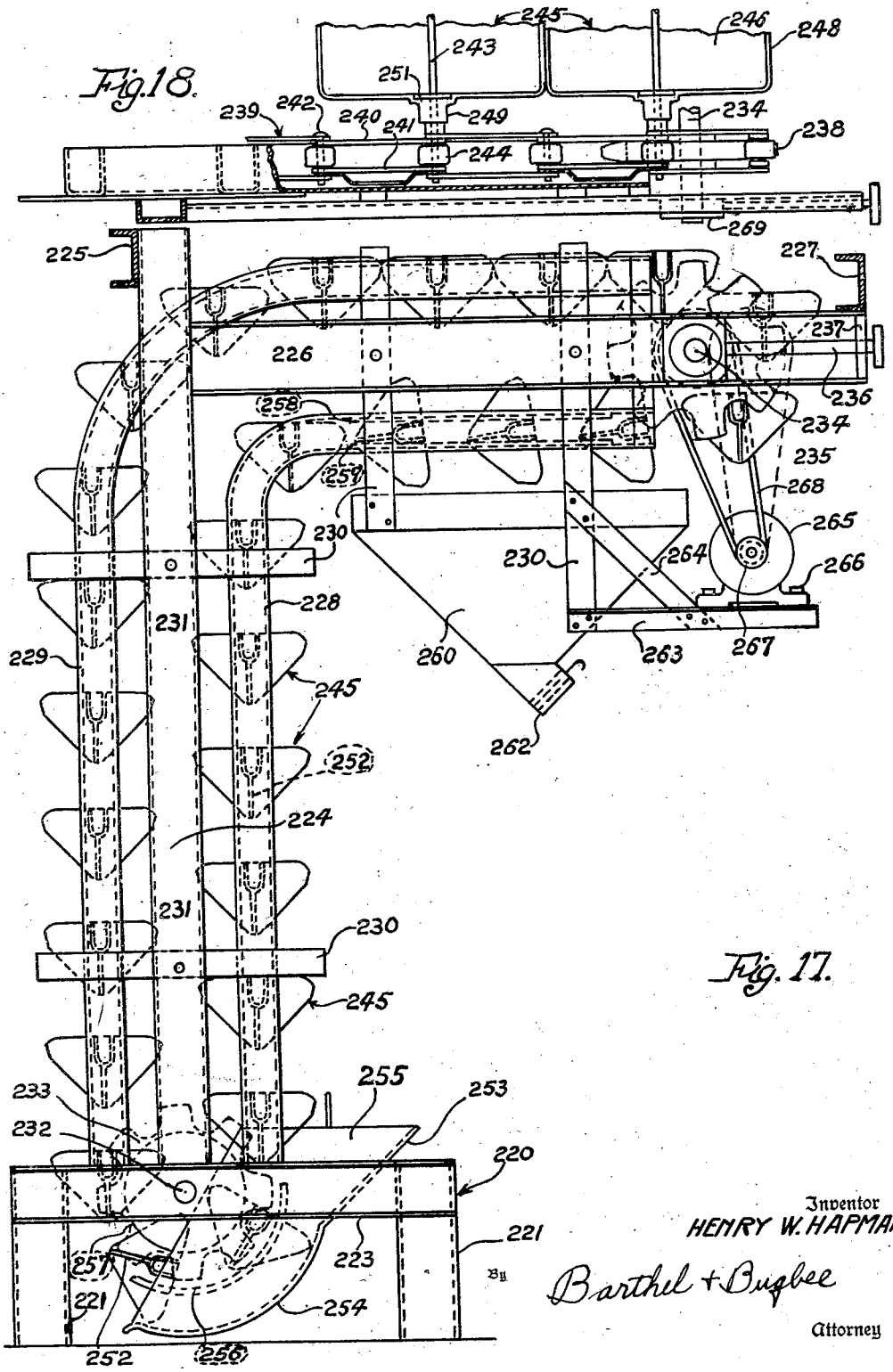

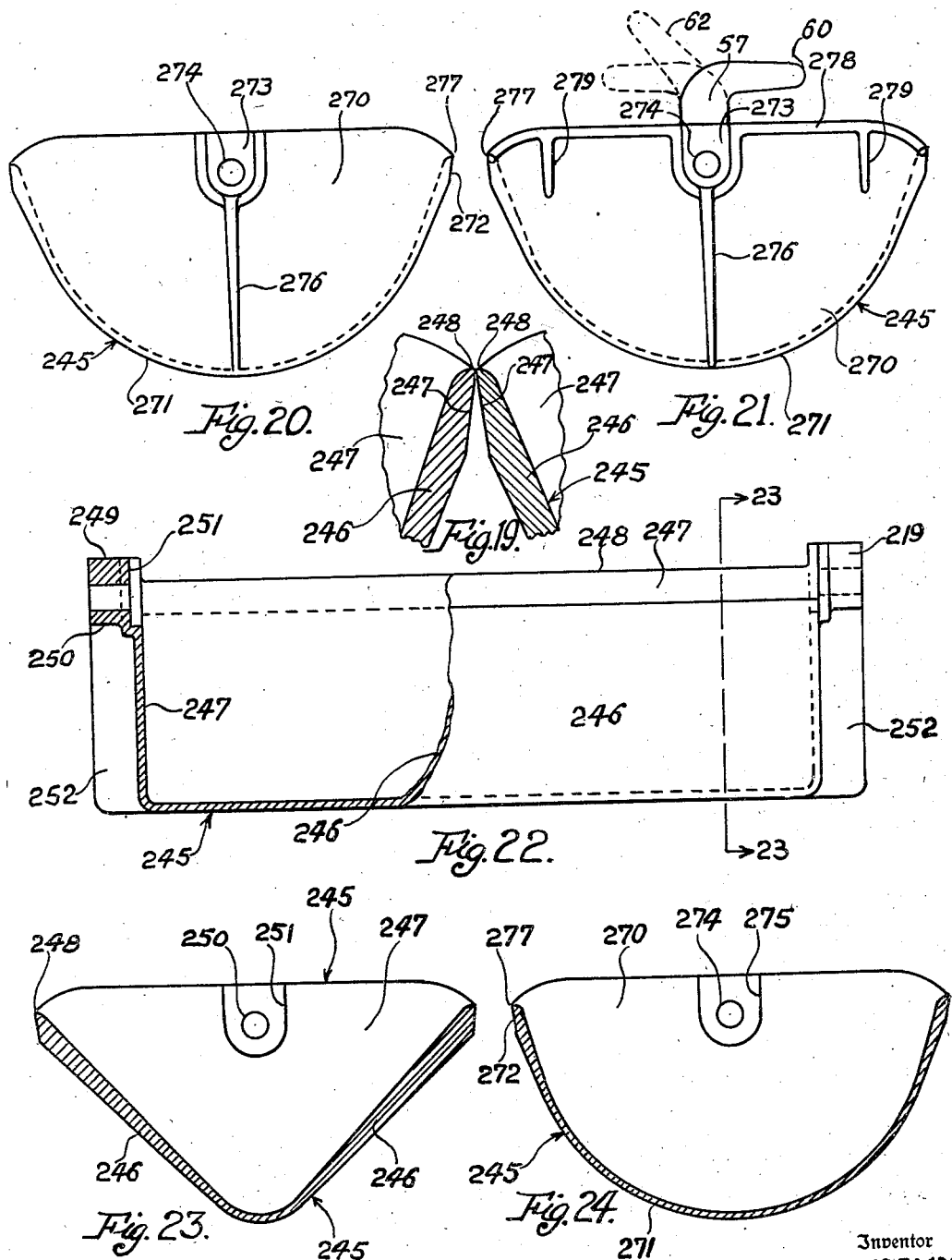

Patented Feb. 3, 1948

2,435,498

UNITED STATES PATENT OFFICE 2,435,498

CONVEYOR STRUCTURE WITH PIVOTED BUCKETS

Henry W. Hapman, Detroit, Mich., assignor to Hapman Conveyors, Inc., Detroit, Mich., a corporation of Michigan Application June 3, 1943, Serial No. 489,427

9 Claims. (Cl. 198—145)

The present invention relates to improvements in conveyor structures and, more particularly, to conveyor structures of the bucket type.

The primary object of the invention is to provide a bucket type conveyor which is comparatively simple in operation and which is economical to manufacture and install and which comprises comparatively few parts to become disorganized and displaced.

Another object of the invention is to provide a conveyor structure having novel and unique means for tripping the buckets as they pass a dumping station and to provide novel means for loading the buckets at a filling station or hopper.

Another object of the invention is to provide a conveyor structure of the above-mentioned character with means for tripping the buckets during their circuitous travel about the various conveyor runs whereby the buckets may be tripped between the filling and loading stations by simply interchanging various parts in the conveyor structure.

Another object of the invention is to provide a conveyor structure having pivoted conveyor buckets which are carried about the various runways in a horizontal position and which are tilted at the filling and loading stations to facilitate the loading and dumping of said buckets.

Another object of the invention is to provide a conveyor structure of the above-mentioned type with a conveyor bucket which may be easily formed and constructed at a comparatively small production cost so that the entire conveyor may be economically constructed and will render efficient service and operation.

Another object of the invention is to provide a conveyor bucket of the pivoted type with means on the end walls for tripping, guiding and dumping the buckets as they traverse the various filling, loading and dumping stations, thereby enabling the conveyor buckets to be used in various types of conveyor structures without requiring numerous changes and alterations.

Another object of the invention is to provide a conveyor bucket of the pivoted type which may be formed from separably connected elements or may be formed in a single piece as by means of stamping, forming or pressing as well as molding.

Another object of the invention is to provide a conveyor structure having a plurality of conveyor buckets, the meeting edges of which are adapted to be arranged and shaped to prevent the passage of material therebetween while being loaded at a filling station and which may be easily tilted with respect to one another when being dumped at a receiving hopper or unloading station.

Another object of the invention is to provide a conveyor structure in which guide ribs are formed on the side walls of the buckets to facilitate the guiding of the buckets during the loading thereof to insure the buckets remaining in a horizontal position while being filled.

Another object of the invention is to provide a conveyor structure in which interchangeable tripping arms may be attached to the buckets of the conveyor structure to facilitate the dumping thereof and to provide means for tilting the buckets prior to their being dumped or unloaded by the various guiding and tripping means on the side walls of the buckets.

Another object of the invention is to provide a conveyor bucket which may be molded in various shapes to suit the conditions under which the conveyor buckets are used and to provide the edges of said buckets with a highly finished surface so that the space therebetween will be comparatively small and prevent the passage of material therethrough during the loading operation.

Another object of the invention is to provide a conveyor structure in which the conveyor buckets are tilted or dumped by suitable guide members cooperating with guideways at each end of said buckets as they pass the unloading station or hopper so that the material being conveyed will be dumped and spread over a relatively large area of the hopper.

Other objects and advantages of the invention will become apparent during the course of the following description of the accompanying drawings, wherein:

Figure 1 is a side elevational view of a preferred embodiment of the invention illustrating the manner in which the pivoted buckets may be tripped and guided during their circuitous travel about a conveyor guideway;

Figure 2 is a side elevational view of a series of conveyor buckets illustrating the manner in which the same are provided with tripping means cooperating with rollers and guide members at the sides of the conveyor;

Figure 3 is an enlarged fragmentary cross sectional view taken on line 3—3 of Figure 2 looking in the direction of the arrows illustrating the manner in which the pivoted conveyor buckets are tripped;

Figure 4 is side elevational view of a portion of the conveyor trackway shown in Figure 1 showing the manner in which the buckets may be provided with tripping means on inclined portions of the trackway;

Figure 5 is a fragmentary top plan view illustrating in detail the arrangement of the various conveyor buckets and the manner in which they are assembled;

Figure 6 is fragmentary side elevational view of a horizontal conveyor runway showing certain of said buckets broken away to illustrate the sealing means for preventing material falling between said buckets and further showing tripping means employed during conveyor travel on horizontal guideways;

Figure 7 is a perspective view of an end portion of one of the conveyor supporting rods showing the manner in which the same is squared for receiving one of the outer links of the chain conveyor;

Figure 8 is a fragmentary perspective view of one of the outer links of said chains illustrating the manner in which the same is apertured;

Figure 9 is a vertical cross sectional view taken on line 9—9 of Figure 6 looking in the direction of the arrows illustrating the various structural details of the conveyor bucket;

Figure 10 is a side elevational view of one of the pivoted conveyor buckets showing the manner in which the same are held in a horizontal position during loading operations;

Figure 11 is a fragmentary side elevational view further illustrating the manner in which the pivoted conveyor buckets are maintained in a horizontal position by means of the guide flanges at each end of the buckets during their travel beneath a loading station;

Figure 12 is a fragmentary top elevational view illustrating one of the buckets and the manner in which it passes beneath the loading station;

Figure 13 is a side elevational view of a conveyor structure employing conveyor buckets of a slightly different shape and illustrating the manner in which the buckets are loaded and maintained horizontal as well as being dumped by the guide and tripping flanges on the ends thereof;

Figure 14 is a vertical cross sectional view taken on line 14—14 of Figure 13 further illustrating the arrangement of the conveyor buckets and the parts incident thereto;

Figure 15 is a fragmentary cross sectional view taken on line 15—15 of Figure 13 looking in the direction of the arrows further illustrating the manner in which the horizontal side flanges come into play with rollers or guide means during their travel beneath a loading station;

Figure 16 is an enlarged fragmentary side elevational view illustrating the manner in which the buckets are dumped as they traverse a guide sprocket by means of the tripping flanges on the side walls of the bucket;

Figure 17 is a side elevational view of another modified form of the invention showing another type of conveyor guideway with conveyor buckets of substantially V-shaped formation which are formed by a single casting and illustrating the manner in which the pivoted conveyor buckets are guided by the tripping flanges on the sides thereof during their passage at the loading and unloading stations;

Figure 18 is a fragmentary top plan view of the bucket structure shown in Figure 17 illustrating in detail the shape and formation of the buckets;

Figure 19 is an enlarged fragmentary cross sectional view showing the manner in which the buckets in Figures 17 and 18 are precision ground to provide closely spaced mating edges whereby the escape of material during loading between the conveyor buckets will be prevented;

Figure 20 is a side elevational view of a further modified form of conveyor bucket which is shaped slightly different than the form of bucket shown in Figure 17;

Figure 21 is a side elevational view of a still further modified conveyor bucket which is similar to the form shown in Figures 1 to 13 inclusive but is formed from a single casting or molding;

Figure 22 is a side elevational view of one of the buckets illustrated in Figures 17 and 18 showing a portion broken away to illustrate the manner in which the interchangeable tripping arms are received in the end walls of the buckets;

Figure 23 is a vertical cross sectional view of a conveyor bucket taken on line 23—23 of Figure 22 looking in the direction of the arrows illustrating the tapered side walls of the conveyor buckets and the manner in which the edges are finished to provide closely spaced meeting edges; and Figure 24 is a similar cross sectional view of the conveyor bucket structure shown in either Figures 20 or 21.

General construction and arrangement

The invention generally comprises a pair of opposed channel guide members arranged about a circuitous course to provide vertical and horizontal runways and the channel guides are adapted to be supported by the frame work or beams of a building or may be supported on a suitable frame in a convenient location and position.

The invention also provides a conveyor bucket structure to be guided by the opposed channel guide members throughout the various runs of the conveyor course and said conveyor buckets are of the pivoted type and have formed on the end walls thereof tripping and guide flanges uniquely arranged to enable the buckets to be tripped and guided during any part of their circuitous travel as desired. In one form of bucket construction, the end and bottom walls are separably held together and the end walls are molded with the tripping and guide flanges thereon to facilitate the dumping and guiding of the buckets as they pass the loading and dumping stations. In another form of the invention, the buckets are constructed of a single molding or casting having the flanges at the ends for guiding and tripping the buckets formed thereon at the time of molding or casting the entire bucket structure.

Further, the invention includes a conveyor structure in which the buckets are tilted and guided as they traverse one of the guide pulleys so that the material being conveyed will be scooped into the bucket during its tilted guided position whereupon the buckets after being filled may be conveyed along a conveyor course to an unloading station where they are again tilted and guided for substantially the full length of travel above the discharge hopper. This construction has the advantage of insuring the complete removal of all of the material from the interior of the bucket and at the same time distributing the material over a relatively large hopper area to prevent overflow of the hopper and the resultant loss of considerable material. In the various forms of bucket constructions, the meeting edges may be provided with overlapping alternately arranged sealing strips, or the adjacent edges of the buckets may be precision ground to provide mating edges which are precision ground so that the edges will be closely spaced to prevent the material falling therethrough during the passage beneath the loading station. If desired, the buckets may be provided with interchangeable tripping arms to facilitate dumping thereof at various locations along the vertical and horizontal conveyor courses as well as obliquely extending courses by simply substituting the tripping arm to suit the specific conditions existing. In the preferred embodiment of the invention, the bucket construction is of a knocked down form to enable the parts to be interchanged when broken or damaged and replaced by new parts without requiring the conveyor being rendered useless during such repairs for great lengths of time.

*Detailed description of the invention*

In the drawings wherein for the purpose of illustrating the invention and wherein like reference characters will be employed to designate like parts throughout the same, attention is first directed to the preferred form of the invention shown in Figures 1 to 12 inclusive wherein the preferred bucket construction is shown as being applied to a runaround conveyor in which the channel guides are suitably supported from the walls or other structural elements of a building B. In Figure 1, the conveyor structure is supported by the walls W and floor supporting surfaces generally designated by the reference characters F and L.

Although the buckets are of a similar form and construction in Figures 1 to 16 inclusive, the various applications of the buckets in Figures 1 to 16 inclusive are shown as being used in connection with differently constructed and types of conveyors and the form shown in Figures 1 to 12 is exemplary of one type of pivoted bucket of the knocked down or separably connected form. In Figures 1 to 12 inclusive, a series of brackets 10 is conveniently positioned and supported by the walls W and floors F and L and said brackets are of general rectangular form and include side rails 11 and end rails 12. Connected to the side rails 12 is a supporting arm 13 having one end secured to a bracket 14 on the wall or floor of a building by means of bolts 15. Bolted to the bracket 14 is a pair of attaching blocks 16 held in place by a bolt 17 on the end of which is threaded a nut as at 18. The rod 13 extends through aligned openings in the blocks 16 and is held therein by clamping nuts 20 and 21 on either side thereof. The opposite end of the rod 13 is similarly secured to a pair of blocks 22 by passing through an opening 23 so as to be held in position by clamping nuts 24 on opposite sides of the block 22. A bolt 25 is secured within an anchoring member 26 having a cavity for receiving the head 26a of the bolt 25 and said bolt extends through a boss 27 in the anchored member 26 and through an opening in the block 22 whereby the free end may be provided with a nut 28 for securely clamping the various parts together.

The channel guide members for the conveyor structure include angle bars 29 having their flanges overlapped as is clearly shown in Figure 10 and said angle bars are clamped to the rectangular supporting frame by bolts 30 having hooked ends 31 which engage over the free edges thereof so that a nut 33 may be threaded on the clamping bolt 30 to tie the angle bars in position and at the same time secure the anchoring block 26 to the end portion 12 of the rectangular frame 10.

Certain of the channel guides 29 may be bent as at 34, 35 and 36 to provide corner bends interconnecting the vertical and horizontal guideways and an interconnecting oblique or angularly disposed guideway 37. One portion of the conveyor guide may be separate from the other portion to enable the slack to be taken out of the conveyor chain and its associated part and said section 29 may be supported at the top and bottom by suitable brackets 32 as well as the supporting brackets 10. This construction leaves a space so that the buckets of the conveyor may sag on their return course and, providing the sag is not too great, the conveyor will operate efficiently throughout the remaining conveyor run. However, when the sag reaches a point to impair efficient operation the sag may be taken out of the return course by an adjustable sprocket or the like.

The conveyor element is formed of a series of buckets generally designated by the reference character 40 and as shown in Figures 1 to 12 the buckets of the preferred form are shaped with slightly rounded bottom walls and each bucket is connected to a conveyor chain generally designated by the reference character 41. Each of the buckets is provided with an end wall 42 which is semi-circular in shape and is adapted to be arranged in opposed relation at each side of the conveyor. The end walls may be molded in identical form so as to be readily interchangeable and replaceable when desired. Formed on the inner wall of each end plate 42 is an inwardly extending marginal flange 43 extending about the arcuate curved portion thereof and spaced from the flange 43 is a similar flange 44 to provide a recess of arcuate formation 45 adapted to receive the opposed edges of the curved bottom wall 46. The bottom wall 46 may be formed of flexible material or a suitable stamping shaped to conform to the contour of the arcuate slot 45 and if desired, the bottom wall may be made of a plastic material shaped or formed to fit the conditions under which the conveyor is used.

Formed on the end walls 42 is an enlarged hub portion or boss 47 which is in alignment with the axis of the bucket to form adequate bearing surface therefor. A transverse bore 48 is formed in each of the enlarged hub portions or bosses 47 for the reception of a tie rod 49 the ends of which are suitably threaded for receiving clamping nuts 50 whereby the end walls may be tightly drawn together into engagement with the side edges of the curved bottom wall 46. Formed integral with the outer wall of the end members 42 is a wing portion or flange 51 extending radially from the hub portion 47 to provide a reenforcing web for the end wall of the bucket and to provide a tripping and guiding flange therefor as the bucket traverses a dumping station. Likewise, formed along the top edge of each of the end walls 42 is a guide rib 53 the ends of which are slightly bent downwardly to facilitate the easy entrance beneath a guide bar or roller during travel through the loading area of the conveyor structure. The guide rib 53 also reenforces the end wall structure 42 in a direction at right angles to the tripping flange or web 51. The hub portions 47 of each end wall are provided with aligned openings 54 for receiving a transversely extending supporting rod 55 and mounted on the supporting rod between the end walls is a tubular spacer 56 having its ends abutting and retaining interchangeable tripping arms 57 within the recesses or depressions 58 formed on the inner walls of the buckets. With the aid of the clamping rod 49, the tripping arms 57 are securely held in recesses 58 which are shaped to receive the inner ends of the tripping arms so that rocking movement of the tripping arms will effect similar movement to the bucket structure 40. Normally, the buckets 40 will assume a horizontal position by reason of the fact that the center of gravity is below the supporting rod 55. The tripping arms 57 may have their free ends extending at right angles as at 60 or if desired, they may be positioned as shown in Figure 1 at 61 so as to provide oppositely extending arms to facilitate dumping of the buckets during their travel in either direction. For some conveyor structures it may be desirable to form the arms 57 obliquely as at 62 in Figure 4 whereby the buckets may be tilted or dumped while traversing an inclined conveyor course 37 (Figure 1). The tripping arms may be easily interchanged by simply removing the nuts 50 and sliding the rod 55 endwise of the bucket construction.

The free ends of the supporting rod 55 are provided with rollers 63 which are positioned between a series of outer chain links 64 and inner chain links 65. The rollers 53 are guided in the opposed channelways or guides formed by the angle bars 29 and alternate links 64 and 65 are provided with connecting chains 66 for supporting intermediate guide rollers 67 which are likewise received in the channelways or guides formed by the angle bars. A washer or the like as at 68 may be positioned between the inner chain links 65 and the integral hub portion 47 to prevent inward movement of the links. The free ends of each of the supporting bars are flattened as at 70 to provide a squared portion terminating in a shoulder 71 as is clearly shown in Figure 7. The outer links 64 are provided in their ends with squared openings 72 for receiving the squared ends of the bar as at 70 to assist in spacing the links and providing ample room for the rollers 53. A cotter key or the like as at 75 may be passed through an opening 76a to retain the chain links, rollers and buckets equidistantly spaced on the rod 55. Similarly, the pins 66 for the alternate ends of the links are squared or flattened as at 74 for receiving slotted openings similar to the openings 72 and a cotter pin or key 73 is likewise inserted through a transverse opening to anchor the links and rollers in position.

In order to hold the buckets centrally positioned with respect to the channel guides, a slide shoe 76 has its ends 77 secured to the free ends of the rod 55 and alternate pins 66 between the links 64 so that the intermediate portion of the slide shoe 76 will engage the bottom wall of the channel guide members and prevent endwise movement of the buckets during their conveyor travel.

It is to be noted that the transverse edges of the flexible members 46 are angularly bent to form lip portions 80 for receiving a sealing strip 81 held in place by rivets or the like 82 secured to alternate angularly bent lips 80 whereby the sealing strips will overlie adjacent lips 80 but yet be free to turn during tilting or dumping in either direction. In Figure 1 a pair of sprockets 83 are mounted on and adjacent the end of a drive shaft 84 for drivingly engaging the conveyor chain to impart motion thereto. The sprocket teeth are formed relatively large to enter the space between the conveyor rollers 63 and 67 of each bucket assembly. The shaft 84 is provided with a pulley over which is trained a belt or the like 85 adapted to be driven by a motor 86.

In Figure 1 it will be noted that a supply hopper 87 is supported above the lowermost conveyor bucket run and is provided with an opening 88 disposed above the conveyor buckets to feed material thereto. A sluice gate 89 is provided in the discharge opening 88 to control the amount of material dispensed to the bucket. Supported on the channel guideway 29 are suitable brackets 90 having bearing portions 91 for receiving relatively short spindles 92 upon which are mounted guide rollers or the like as at 93 for engaging the flanges 53 of each bucket. A guide bar may be similarly positioned in lieu of the rollers to guide the buckets in a horizontal plane during their travel beneath the loading station. The brackets 90 are held in place by bolts 94 extending through certain flanges of the angle bars 29.

After the loaded buckets have moved to the upper horizontal conveyor run by moving in the direction indicated by the arrows in Figure 1, they may be dumped at an unloading station into a hopper 95 having a relatively wide mouth portion 96 by means of tripping arms 57. Directly above the hopper 95 and supported between the channel guide ways 29 is a tripper rod 96 having its free ends rotatably supported in bearing brackets 97 fastened in place by machine screws or the like as at 98. Retaining collars 99 are secured to the ends of the rod 96 in spaced relation thereon so as to be positioned on opposite sides of the brackets 97 and thereby prevent endwise movement of the trip rod 96. As the free ends 60 of the trip arms 57 engage the rod 96 the buckets are tilted and rocked so that the contents will fall into the hopper 95. Should it be desired to dump the buckets at another unloading station, it is simply necessary to remove the rod 96 so that the material will be carried to another dumping station having a hopper 100 with a funnel shaped throat 101 so that the buckets may be tilted above said throat. It may be desirable to provide a different form of tripping means or unloading station or hopper 100 and to accomplish this, bracket members 102 have their bases 103 secured to the underside of the channel guide ways 29 as indicated in Figure 3 by bolts 104. A shaft or spindle 105 is rotatably supported in the bracket 102 and is provided at one end with a retaining collar 106 and at the opposite end to a roller 107 having a relatively large hub portion 108. The end of the spindle 105 is provided with a head 109 to prevent displacement of the roller 107 and it is to be noted that a pair of such rollers 107 are positioned directly above the unloading station or hopper 100 so as to impart a complete rotation to each bucket as it traverses the throat 101. By reference to Figure 2 it will be seen that the tripping wing 51 is first engaged by the roller 107 and upon continued travel of the conveyor the next roller 107 engages the roller guide 53 whereupon the bucket will be turned about a complete revolution to completely dislodge any material adhering thereto.

The tripping roller 107 will be used at the end of the conveyor travel and the supplemental tripping means may be used in advance thereof.

It is to be noted that the rollers 107 are spaced a sufficient distance so that the first rollers engaged will impart an initial rocking movement to each bucket 40 and the continued travel of the bucket conveyor will position the guide 53 so that the front edge is in engagement with the second roller 107.

Should it be desired to unload in an inclined position of the channel guideways 29, a hopper 110 is provided beneath the angularly disposed runways 37 as shown in Figure 1 and in this case, a tripping rod 96 will be positioned between the channel ways of the angular run 37 and tripping arms 57 having the angularly disposed free end 62 will be supplied to the ends of the buckets in lieu of the tripping arms 57 having the ends 60 formed at right angles to the tripping arms. The hoppers 95, 100 and 110 are provided with outlets 112, 113 and 114 respectively, for discharging of material into a chute, vehicle or bin, or other chamber.

The oppositely disposed channel forming angle bars 29 may be welded at spaced intervals as indicated at 115 or other means for fastening the channel way angle irons may be provided to suit the requirements of the particular construction.

Obviously, bars of channel formation may be substituted for the channel way forming angle bars 29 but it has been found in practice that by employing angle bars various forms and shapes may be imparted thereto without considerable expense.

In Figures 11 and 12 a loading hopper 116 is substituted for the hopper 87 and is provided with bottom wall 117 having an opening disposed above the conveyor buckets 40. Angle brackets 118 are connected to the hopper wall 116 between which is pivotally mounted a scraper or spreader bar 119 of V-shaped formation having bracket portions 120 attached thereto as at 121 for being received between the brackets 118 so that bolts or the like as at 122 may pivot the spreader bar 119 for free vertical movement above the buckets and thereby cause the material dispensed from the hopper 116 to be spread endwise of the buckets during their travel beneath the loading station.

*Modification of the invention shown in Figures 13 to 16 inclusive*

In this form of the invention, the bucket construction is similar to the construction shown in Figures 1 to 12 with the exception that the buckets are differently spaced and are more or less of triangular contour to provide relatively straight side walls and thereby enable the material to be freed therefrom in an easy manner. The conveyor structure is shown as being applied to a portable frame of triangular shape generally designated by the reference character 125 and comprises a pair of side bars 126 having caster supporting brackets 127 at the ends thereof for accommodating casters 128 having rollers 129. One end of the bars 126 is provided with vertical angle bars 130 fastened in place as at 131 by a bracket 132. A diagonal frame bar 133 has one end connected by bolts or the like as at 134 to the side rails 126 while the opposite end is supported by a bracket 135 attached to the upper end of the vertical bar 130. A pair of angle bars 136 are connected as at 138 and 139 to the diagonal bar 135 and vertical bar 130 for supporting a platform 140 for accommodating a motor 141 secured in place by bolting the base thereof as at 142 in position by bolts 143. The frame structure above described is adapted to support a Z-type conveyor structure including opposed channel guides 144 constructed identical to the guides 29 and said channel guides are supported by suitable brackets 146 having their bases 147 secured to convenient portions of the frame and diagonal bar 143 by bolts or the like 148. A pair of blocks 151 are pivoted to the brackets 146 by means of suitable pins 150 and supporting rods 153 are carried by the blocks 151 and are held in place by clamping butts 154. Similarly, supporting blocks 155 are mounted on the free ends of the rod 153 and are clamped in place by nuts 156 threaded on the ends thereof. A transverse rod 157 has its end threaded as at 158 for being attached to the blocks 155 by means of bolts 159. Channel supporting brackets 160 are mounted on the rod 157 and are provided with enlarged bosses 161 to form hub portions therefor. A spacer rod is located between opposed pairs of brackets 160 as shown in Figure 14 to retain the brackets in spaced relation. Each of the brackets 160 is provided with a pair of spaced arms 162 and 163 for receiving the channelways or guides 144 and set screws or the like 164 are provided for anchoring the channelways in position.

The endless bucket conveyor structure comprises a pair of endless chains generally designated by the reference character 165 and said chain traverses a sprocket 169 mounted on a shaft 166 supported on the upper end of a bracket 167 attached to the frame by means of bolts or the like 168. The other end of each conveyor chain traverses a similar sprocket 174 mounted on a shaft 175 journaled in an adjustable block 176 suitably mounted for sliding motion within an opening 177. The block 176 is provided with a screw shaft 178 which projects through a lug 179 struck out of the side frame 126 so that it may be adjusted by the nut 180. An unloading hopper 170 is supported by brackets 171 attached as at one end as at 173 to the diagonal bar 133 and secured by rivets 172 to the hopper 170. The hopper is positioned to receive material from the buckets 144 as they are dumped during their passage about the sprocket wheel 169. Each of the conveyor chains 165 is provided with a series of spaced rollers 181 which are guided in the channelways 144 and mounted between the rollers and connected to the chains is a series of conveyor buckets 182 formed from a single sheet of material bent V-shaped to provide converging walls 182a. End walls 183 are constructed similar to the end walls 42 shown in Figures 1 to 12 inclusive and said end walls are provided with guide ribs 184 and tripping ribs 185 for being engaged by the various instrumentalities for tripping and guiding the buckets during their passage or travel through the loading and dumping stations. The buckets are supported by rods 186 which extend through the rollers 181 and have keys or the like secured in openings in the free ends of the rods 187 similar to the rods 55. The free ends of the rods extend through the chain links 190 and 192 between which the rollers 181 are mounted and suitably held in position. A tie rod 194 extends through the ends of the conveyor bucket walls 183 to anchor the same in clamping engagement similar to the tie rods 49. Spacing sleeves 195 are mounted on supporting rods 187 to hold the end walls 183 in spaced relation and if desired for clamping tripping arms in place similar to the tripping arms 57.

The conveyor chains are driven by the motor 141 and a belt or the like 198 is trained over a pulley on the armature shaft of the motor 197 for drivingly connecting a similar pulley on the shaft 166. Also mounted on the shaft 166 adjacent each end is a pair of collars 199 for engaging the flanges 185 to cause the buckets to tilt and trip during their passage over the sprockets so that the material therein will fall into the hopper 170. The guide 199 may be in the form of a cylinder in lieu of the collar to engage the walls of the buckets and during the travel of the buckets about the shaft 166 they are completely rotated about 360 degrees to insure the unloading thereof.

A supply hopper 200 is supported by vertical bars 201 fastened in place as at 202 and 203 so that the discharge mouth of the hopper 204 will be positioned above the buckets as they travel therebeneath in the direction of the arrow. A sluice gate 205 is provided for controlling the discharge of the material through the opening 204. Mounted on the top runway of the channel bars 114 is a bar 206 secured in place by bolts 207 and said bar 206 may have flanges for engaging the guide flanges 184 on the buckets or as shown, may be provided with a series of stub shafts 208 for supporting a series of rollers 209 adapted to engage the guide flanges 184 and maintain the buckets in a horizontal position during their travel beneath the hopper 200.

Mounted beneath the loading hopper 200 is a collection drawer 210 in an opening 211 formed in the side rails 126 and extending along the opening and transversely of the rails 126 is a pair of guide bars 112 for supporting the drawer 210 and thereby facilitating easy removal when the same is filled. A handle 213 is provided on the drawer 210 for this purpose.

Additional brackets 214 may be provided along the side bars 126 and held in place by rivets or the like 215 for supporting various portions of the channel guideways 144.

*Modification shown in Figures 17, 18, 19, 22 and 23*

The conveyor structure including the framework and method of loading and unloading is slightly different from the forms shown in Figures 1 and 13 and the conveyor buckets are formed of a single stamping or casting rather than from separable parts or elements as shown in Figures 1 to 16 inclusive. In this form of the invention, the conveyor structure embodies a base 220 having upright supports 221 connected by a pair of side frame members 223 extending between the upper ends thereof. Projecting upwardly from the side frame members 223 is a pair of parallel frame bars 224 the upper ends of which are attached to one of the girders or beams of a building structure designated by the reference character 225. Connected to the vertical uprights 224 and extending laterally therefrom is a pair of horizontal supporting beams 226 which have their free ends similarly attached to girders or supports 227 extending through the building or plant in which the conveyor is used.

Supported by the vertical frame members 224 and horizontal frame members 226 is a pair of opposed channel guide members 228 and 229 which are constructed from angle bars similar to the channel guides 29 and 144, and one end of each pair of channel guides 228 and 229 is connected to the horizontal frame bar 223 by welding or the like. The opposite ends terminate adjacent the free ends of the horizontal supporting bars 226. The channel guide members 228 and 229 are suitably supported by brackets 230 similar to the brackets 10 and 160 shown in Figures 1 to 16 and are fastened in place by suitable bolts or rivets 231.

Mounted between the horizontal frame bars 223 is a shaft 232 having its ends journaled in suitable bearings and adjacent each end of the shaft 232 are sprocket wheels 233 in alignment with the opposed channel guideways 228 and 229. Similarly, a sprocket wheel is carried at each end of a shaft 234 journaled in adjustable blocks 235 reciprocably mounted between the flanges of the horizontal supporting beams 226. A screw shaft 236 is threaded in a lug 237 carried by the free end of each horizontal supporting bar 226 and each of the screw shafts 236 have their inner ends connected to the slide blocks 235 to facilitate adjustment of the shaft 234. Adjacent each end of the shaft 234 is a sprocket wheel 238 similar in construction to sprocket wheel 233 and trained over said sprocket wheel is a pair of spaced conveyor chains 239 likewise formed similar to the sprocket chains shown in Figures 1 to 16 inclusive. Each of the sprocket chains comprises inner and outer links 240 and 241 connected by link pins 242 as is clearly shown in Figure 18. Rollers 243 are mounted between alternate sets of chain links 240 and 241 which are guided in channel ways 228 and 229. The alternate links 240 and 241 are connected by horizontal bars 243 and are provided with rollers 244 on ends thereof for being guided in channelways 228 and 229 and thereby supporting the horizontal rod 243 upon which the pivoted conveyor buckets are carried which are generally designated by the reference character 245, clearly shown in Figure 18.

The V-shaped buckets 245 shown in Figures 17, 18, 19, 22 and 23 are formed of a single stamping or molded member to provide sloping bucket walls 246 connected at the ends by end walls 247. The buckets may be formed from plastic material or metal by pressing, shaping or forming in suitable molds in much the same manner as the end walls of the conveyor bucket shown in Figures 1 to 16 inclusive. The upper edges of the convergent side walls 246 extend a slight distance above the pivoted axis thereof and are ground at the mating edges as at 247 to provide closely spaced mating surfaces 248. The surfaces may be precision ground in order to insure proper alignment and registry of the bucket edges during their continuous conveyor travel and propulsion by the conveyor chains 239.

The upper edges of the conveyor buckets are provided with enlarged bosses 249 having apertures 250 for receiving the supporting rods 243 and in this construction the spacer sleeves and rods are eliminated and support is had solely through the side walls 247. The opening 250 is slightly below the upper edge 248 of the convergent side walls 246 so that the arc of swing of the edges 248 will be slightly above a line on a plane with the rods 243. This construction allows the buckets to tilt and be dumped and enables the edge of one bucket as at 248 to follow the ground portion 247 during its tilting movement and thereby prevent displacement of material therebetween.

Recesses 251 are formed on the inner sides of the end walls 247 for receiving interchangeable tripping arms such as the tripping arms 57 shown in Figures 1 to 12 inclusive. Obviously, the tripping arms may be of various shapes as disclosed in connection with these figures. Formed on the outer side of the end walls 247 are radially extending flanges 252 adapted to guide the buckets during their travel adacent the filling station and to trip and guide said buckets as they traverse the unloading station.

Attention is again directed to Figure 17 wherein there is shown a hopper 253 supported between the horizontal side frame members 223 and said hopper is positioned in close proximity to the sprockets 233 and is provided with an arcuately curved bottom wall portion 254 extending therebeneath. Side walls 255 extend along the radial faces of the sprockets 233 to complete the structure and provide a chamber into which the buckets 245 may dip as they traverse the sprocket 233 to pick up material and convey the same to a dumping hopper thereabove. As the pivoted buckets 245 travel downward and as they reach the lowermost portion of the opposed guides 229 they are tilted by means of the tripping flange 252 engaging an arcuately curved tripping bar 256 projecting inwardly from the side walls 255 of the hopper. In order to prevent the buckets from being completely rotated when tripped by the arcuately curved bar 256, the sprocket shaft 232 is provided adjacent its ends with inwardly spaced discs or collars 257 which are adapted to cooperate with the arcuately curved guide bars 256 and form a tripping guide slot therebetween. This construction enables the bucket to be tilted and retained in a tilted position during partial travel about the sprockets 233 so that material in the hopper 253 will be scooped therefrom and carried upwardly in the conveyor bucket.

As the loaded conveyor buckets reach the end of their upward travel they are again tilted by tripping flanges 258 and 259 formed on the horizontal portion of the opposed channel guides 228. As the buckets are tripped as shown in Figure 17, above the receiving hopper 260, the lower edge is presented to the material collected in the hopper so that continued travel of the bucket in its tripped position will spread the material in the hopper 260 from the entrance end to the opposite end. The hopper 260 is supported by certain of said channel guide supporting brackets 230 and a discharge orifice 262 is formed in the hopper to dispense the materials collected therein. During the initial tilting movement, by the engagement of the tripping flange 252 with the guide flange 259 complete turning movement of the bucket will be prevented by the upper guide 258 and it is intended that the tripping flange 252 of each bucket pass therebetween so that when the bucket encounters a load in the hopper complete revolution thereof will be prevented by the tripping flange 262 engaging the horizontal guide flange 258.

A motor supporting platform 263 may be connected to one of the sets of channelway brackets 230 and may be braced by a brace bar 264 riveted or otherwise secured in place. The motor 265 is supported on the platform 263 and is bolted thereto as at 266 beneath the sprocket shaft 234. The armature shaft of the motor is provided with a pulley 267 over which is trained a belt or the like 268 for being drivingly connected to a similar pulley 269 on the outer end of the sprocket shaft 234.

In Figures 20 and 24 there is shown a bucket similar to the pivoted bucket 245 in which the entire structure is molded or formed from plastic or metal material and said bucket includes end walls 270 having curved bottom walls 271 similar to the buckets 40 shown in Figures 1 to 12 inclusive. The buckets in Figures 20 and 24 have their upper edges ground as at 272 to provide meeting edges which are closely spaced when the buckets are assembled in a conveyor structure. An enlarged boss 273 is formed on the outer wall 270 and is apertured as at 274 for receiving horizontal supporting bars similar to the supporting bars 243. Recesses 275 are formed on the inner walls for the reception of tripping arms similar to the tripping arms 57 and when said tripping arms are used the spacer sleeves may be employed on the bars 243. In the construction shown in Figures 20 and 24 a radially extending tripping rib 276 is formed on the outer radial face of the wall 270 in substantially the same manner as the tripping ribs 252. It is to be noted that the extreme upper edges of the arcuately curved bucket wall 271 as at 277 extend above the axis of the opening 274 to increase the length of arc of said edge 277 and insure the buckets being closely spaced to prevent loss of material therebetween.

The conveyor bucket shown in Figure 21 is identical in formation to the bucket shown in Figures 20 and 24 and includes side walls 270 and a curved wall 271 as well as an enlarged boss 273 apertured as at 274 to receive the supporting rods 243. In addition to the radially extending tripping rib or web 276, the upper edges of the bucket side walls 270 are provided with oppositely extending guide ribs 278 similar to the guide ribs 53 and 184 shown in Figures 1 to 16 inclusive. Reenforcing web portions 279 are formed adjacent the ends of the guide ribs 278 and connect the same with the side walls 270 to brace the flange 278 and prevent breakage thereof. This form of bucket may be used in a conveyor structure in lieu of the bucket 40 shown in Figures 1 to 12 inclusive while the bucket illustrated in Figures 19, 22 and 23 may be used or substituted for the buckets 182 shown in Figures 13 to 16 inclusive, and when so used the rollers or other guide members may engage the upper edges of the buckets during their travel beneath a loading station to hold the buckets in a horizontal position.

Similarly, the buckets 245 may be interchanged in the various structures shown in Figures 1, 13 and 17 by interchanging the parts such as the tripping arms and various other elements.

In the form of the invention shown in Figures 17 to 24 inclusive, it may be desirable in certain conveyor structures handling finely divided material, to arrange the conveyor buckets closely together so that the ground edges will snugly fit adjacent bucket edges to thereby prevent material from passing between the buckets during loading thereof. When the buckets are so positioned a guide bar extending along the loaded course of the conveyor may cooperate with the top edges or flanges of the buckets to maintain the same horizontal and at the tripping or unloading station the guide bar will be interrupted to facilitate dumping of the buckets by the tripping flanges or interchangeable tripping arms depending upon the specific type of conveyor.

It is to be understood that the forms of the invention herewith shown and described are to be taken as preferred embodiments of the same and that various changes in the shape, size and arrangement of parts may be resorted to without departing from the spirit of the invention or the scope of the subjoined claims.

What I claim is:

1. A conveyor structure comprising a pair of opposed channel guideways forming a circuitous conveyor pathway, endless conveyor chains in said guideways formed of a series of pivotally connected link members, pivoted conveyor buckets extending between and supported by said conveyor chains with their pivotal axes coincident with the pivotal axis of certain of said link members, a loading station and an unloading station arranged in spaced-apart relation along said guideways, bucket guiding and tilting members arranged adjacent said loading and unloading stations, and radially-extending projections arranged on the end walls of said buckets and cooperable and engageable with said bucket guiding and tilting members for guiding and tilting the buckets as they move through the loading and unloading stations.

2. A conveyor structure comprising a pair of opposed channel guideways, endless conveyor chains in said guideways formed of a series of pivotally connected link members, conveyor buckets extending between and pivotally supported by said conveyor chains with their pivotal axes coincident with the pivotal axes of certain of said link members, a loading station and an unloading station arranged in spaced apart relation along said guideways, guide strips arranged adjacent said loading station, radially extending projections emanating from a point adjacent the pivotal axes of said conveyor buckets and formed on the end walls of said buckets, said projections being engageable with said guide strips for guiding and positioning the buckets to receive material as they move through the loading station, and a guide member arranged adjacent said unloading station engageable with said radially extending projections for tripping the buckets as they traverse the unloading station.

3. A conveyor structure, comprising a pair of opposed channel guideways, conveyor sprockets at each end of the conveyor structure, endless conveyor chains in said guideways formed of a series of pivotally connected link members and trained over said sprockets, pivoted conveyor buckets extending between and supported by said conveyor chains with their pivotal axis coincident with the pivotal axes of certain of said link members, a loading station, an unloading station, arcuately curved guide strips arranged adjacent the loading station and extending about one of said sprockets, radially extending ribs arranged on the end walls of said buckets emanating from a point adjacent the pivotal axes of said buckets and cooperable with said guide strips for guiding and tilting the conveyor buckets as they move through the loading station and traverse said one conveyor sprocket, and a guide member arranged adjacent the unloading station engageable with said radially extending ribs for tripping said buckets and maintaining said buckets in a tilted position as they pass the unloading station.

4. A conveyor structure comprising a pair of opposed channel guideways, conveyor sprockets at each end of said conveyor structure, endless conveyor chains in said guideways formed of a series of pivotally connected link members trained over said sprockets, conveyor buckets extending between and pivotally supported by said conveyor chains with their pivotal axes coincident with the pivotal axis of certain of said link members, a loading station adjacent one of the sprockets, guide members adjacent and extending about the loading station sprocket, an unloading station adjacent the other sprocket, and radially extending projections arranged on the end walls of said buckets for guiding and positioning the conveyor buckets as they traverse the sprocket at the loading station to receive material as they move through the loading station, said projections comprising radially extending ribs formed on the end walls of and emanating from a point adjacent the pivotal axes of the buckets to engage said guide members extending about one of the sprockets adjacent the loading station.

5. A conveyor structure comprising a pair of opposed channel guideways providing a conveyor pathway, endless conveyor chains in said guideways formed of a series of pivoted link members, conveyor buckets extending between and pivotally supported by said conveyor chains with the pivotal axis of each of said buckets coincident with the pivotal axis of certain of said link members, loading and unloading stations along said conveyor pathway, radially extending projections on the end walls of said buckets for guiding and positioning the same to receive material as they move through the loading station, and for tripping the buckets as they traverse the unloading station, said guiding and tripping projections comprising integrally connected ribs formed on the end walls of the bucket and extending radially from a point adjacent the pivotal axis of said buckets, and guide members adjacent the loading and unloading stations engageable by said radially extending projections, whereby said conveyor buckets will be maintained in filling and dumping positions during the major portion of their travel in the loading and unloading stations respectively.

6. A conveyor structure, comprising a pair of opposed channel guideways arranged in spaced relation to provide a conveyor pathway, loading and unloading stations along said conveyor pathway, endless conveyor chains guided in said channel guideways formed of a series of pivotally connected link members, trough-shaped conveyor buckets pivotally supported between said conveyor chains with their pivotal axes coincident with the pivotal axes of certain of said link members, guide members at the sides of said conveyor pathway between the buckets and guideways, and integrally connected ribs formed on the end walls of the buckets engageable with said guide members for tilting said buckets as they traverse spaced loading and unloading stations, whereby the buckets will be angled to scoop material from the loading station and tilted to discharge the material as they traverse the unloading station, said integral ribs being arranged to extend radially from a point adjacent the pivotal axis of said buckets.

7. A conveyor structure, comprising a pair of opposed channel guideways arranged in spaced relation to provide a conveyor pathway, endless conveyor chains in said channel guideways formed of a series of pivotally connected link members, trough-shaped conveyor buckets pivotally supported between said chains with their pivotal axes coincident to the pivotal axis of certain of said link members, integrally connected ribs extending radially from the pivotal axis of said buckets and formed on the end walls thereof, loading and unloading stations arranged along said conveyor pathway, guide bars arranged adjacent said loading and unloading stations and engageable with said ribs for tilting said buckets as they traverse said loading and unloading stations, whereby the buckets will be angled to scoop material from the loading station and tilted to discharge the material as they traverse the unloading station, said radially extending ribs cooperating with said guide bars which are arranged to extend the full length of the unloading station to cause said buckets to engage and spread the material thereover after said buckets have been discharged.

8. A conveyor structure, comprising a pair of opposed channel guideways in spaced relation to provide a conveyor pathway, endless conveyor chains in said channel guideways formed of a series of pivotally connected link members, trough-shaped conveyor buckets pivotally supported between said chains with their pivotal axes coincident with the pivotal axis of certain of said link members, integrally connected ribs formed on the end walls of the buckets and arranged to extend radially from the pivotal axis of said buckets, loading and unloading stations arranged in spaced relation along said conveyor pathway, and guide members arranged adjacent said loading and unloading stations and engageable with said ribs for positioning said buckets as they traverse said loading and unloading stations, whereby the buckets will be correctly positioned to receive the material from the loading station and tilted to discharge the material as they traverse the unloading station, said buckets being closely spaced and provided with ground meeting edges to prevent the escape of material therebetween during passage through the loading station.

9. A conveyor structure comprising a pair of spaced opposed channel guideways defining a circuitous conveyor course and pathway, loading and unloading stations at each end of said conveyor pathway, an endless conveyor chain in each of said channel guides formed of a series of pivotally connected link members, trough-shaped pivoted conveyor buckets extending between and supported by said conveyor chains with their pivotal axis coincident with the pivotal axis of certain of said link members and within the confines of said channel guideway and a hopper located adjacent one end of the conveyor structure in the path of said buckets, guide projections on the end walls of said buckets extending radially from the pivotal axis thereof, a guide member at one end of the conveyor structure adjacent the loading station, cooperable with the radial guide projections on the ends of the buckets to tilt the same as the buckets traverse said hopper, and a bucket tripping member adjacent said unloading station cooperable with said radial guide projections to tilt the buckets as they pass said unloading station to thereby maintain the buckets in a tilted position during their travel over said unloading station and to spread material over the entire area of the unloading station.

HENRY W. HAPMAN.

REFERENCES CITED

The following references are of record in the file of this patent:

UNITED STATES PATENTS

| Number | Name | Date |
|---|---|---|
| 402,160 | Hogeland | Apr. 30, 1889 |
| 503,870 | McCaslin | Aug. 22, 1893 |
| 660,451 | McCaslin | Oct. 23, 1900 |
| 669,571 | Berghoefer | Mar. 12, 1901 |
| 677,157 | Hosher | June 25, 1901 |
| 779,758 | Becchi | Jan. 10, 1905 |
| 943,121 | Merian | Dec. 14, 1909 |
| 968,795 | Peck | Aug. 30, 1910 |
| 1,090,156 | Kendall | Mar. 17, 1914 |
| 1,445,277 | Hansen | Feb. 13, 1923 |
| 1,710,385 | Streich et al. | Apr. 23, 1929 |
| 2,104,431 | Marasso | Jan. 4, 1938 |

FOREIGN PATENTS

| Number | Country | Date |
|---|---|---|
| 606,648 | Germany | Dec. 7, 1934 |